US012221216B2

(12) United States Patent
Blanc et al.

(10) Patent No.: US 12,221,216 B2
(45) Date of Patent: Feb. 11, 2025

(54) METHOD AND ARCHITECTURE FOR SUPPLYING AIR TO AN AUXILIARY POWER UNIT OF AN AIRCRAFT

(71) Applicant: SAFRAN POWER UNITS, Toulouse (FR)

(72) Inventors: Bernard Blanc, Moissy-Cramayel (FR); Damien Jacques Arthur Bonhomme, Moissy-Cramayel (FR)

(73) Assignee: SAFRAN POWER UNITS, Toulouse (FR)

( * ) Notice: Subject to any disclaimer, the term of this patent is extended or adjusted under 35 U.S.C. 154(b) by 0 days.

(21) Appl. No.: 18/252,833

(22) PCT Filed: Nov. 9, 2021

(86) PCT No.: PCT/FR2021/051981
§ 371 (c)(1),
(2) Date: May 12, 2023

(87) PCT Pub. No.: WO2022/101576
PCT Pub. Date: May 19, 2022

(65) Prior Publication Data
US 2024/0002059 A1   Jan. 4, 2024

(30) Foreign Application Priority Data
Nov. 12, 2020 (FR) ...................... 2011608

(51) Int. Cl.
*B64D 13/00* (2006.01)
*B64D 13/06* (2006.01)
*B64D 41/00* (2006.01)

(52) U.S. Cl.
CPC ............. *B64D 13/06* (2013.01); *B64D 41/00* (2013.01); *B64D 2013/0611* (2013.01); *B64D 2013/0648* (2013.01)

(58) Field of Classification Search
None
See application file for complete search history.

(56) References Cited

U.S. PATENT DOCUMENTS 2,800,002 A * 7/1957 Seed .................... B64D 13/06
62/402
3,159,000 A * 12/1964 McCombs, Jr. .......... F02C 9/16
60/39.15

(Continued)

FOREIGN PATENT DOCUMENTS

WO   2014118455 A1   8/2014

OTHER PUBLICATIONS

French Search Report issued in FR 2011608, mailed on Sep. 23, 2021.

(Continued)

*Primary Examiner* — Edwin Kang
(74) *Attorney, Agent, or Firm* — Bookoff McAndrews, PLLC

(57) ABSTRACT

An architecture for supplying air to a high-pressure compressor of an auxiliary gas generator from a pressurized cabin of an aircraft, comprising: a load compressor rotationally driven by a common rotation shaft providing a mechanical coupling between the high-pressure compressor and a high-pressure turbine of the auxiliary gas generator and supplied by an outside air intake; a first regulation valve assembled at the outlet of the load compressor to control all or part of the air flow delivered by the load compressor; a second regulation valve assembled at the outlet of the pressurized cabin to control the air flow drawn from inside the pressurized cabin; a mixer receiving the outputs of the first and second regulation valves to add the air drawn from inside the pressurized cabin to all or part of the air delivered by the load compressor.

8 Claims, 2 Drawing Sheets

(56) References Cited

U.S. PATENT DOCUMENTS

| | | | |
|---|---|---|---|
| 5,722,229 A | 3/1998 | Provost | |
| 2007/0234731 A1 | 10/2007 | Sheldon et al. | |
| 2009/0025393 A1* | 1/2009 | Sheldon | F02C 7/045 |
| | | | 60/725 |
| 2016/0025339 A1* | 1/2016 | Kamath | F02C 3/04 |
| | | | 60/39.12 |
| 2018/0346132 A1* | 12/2018 | Casado-Montero | B64D 13/08 |
| 2019/0367173 A1 | 12/2019 | Zug | |
| 2020/0141327 A1* | 5/2020 | Redford | F02C 3/04 |
| 2020/0180772 A1* | 6/2020 | Richardson | B64D 13/08 |
| 2021/0291991 A1* | 9/2021 | Army | B64D 13/06 |

OTHER PUBLICATIONS

International Search Report and Written Opinion issued in International Application No. PCT/FR2021/051981, mailed on Feb. 18, 2022.

* cited by examiner

[Fig. 1]
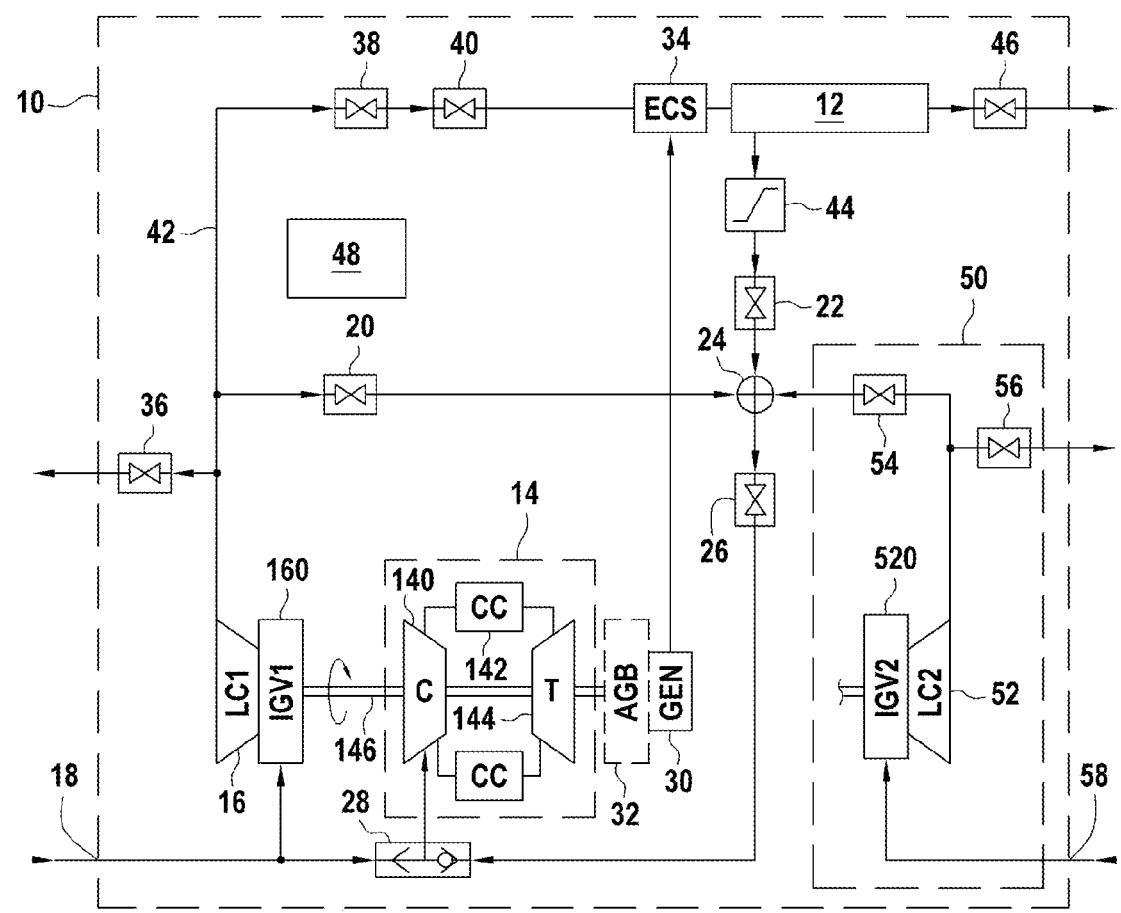

[Fig. 2]
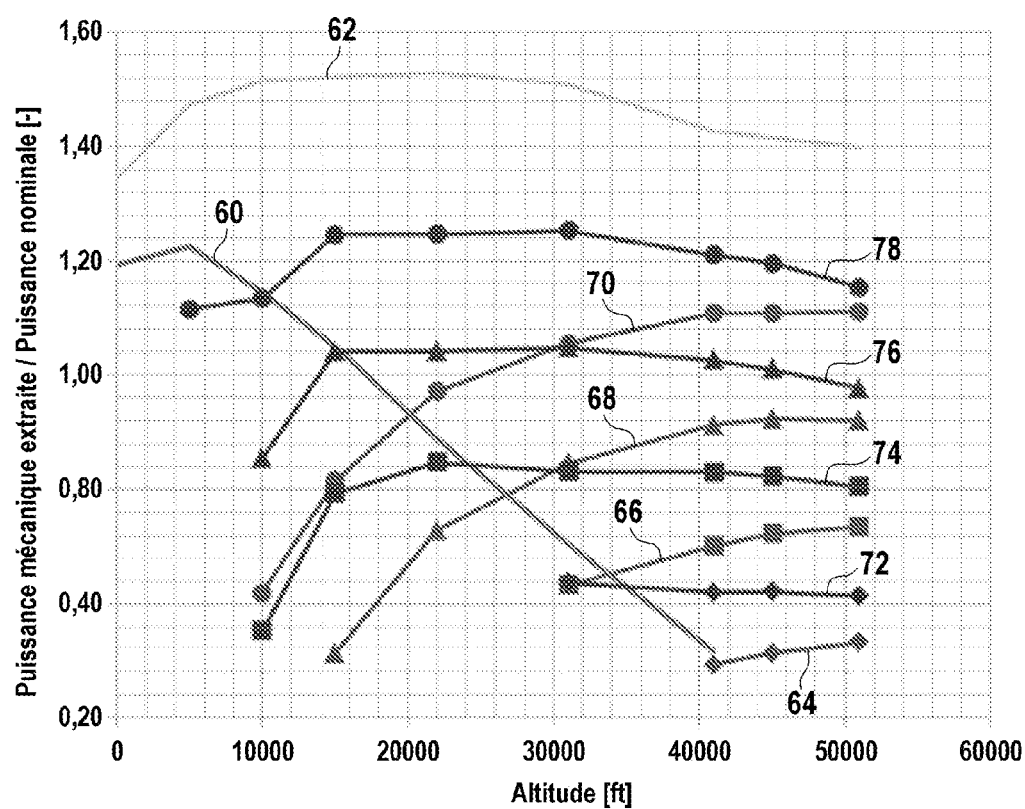

METHOD AND ARCHITECTURE FOR SUPPLYING AIR TO AN AUXILIARY POWER UNIT OF AN AIRCRAFT

CROSS-REFERENCE TO RELATED APPLICATIONS

This is a National Stage Application under 35 U.S.C. § 371 of International Application No. PCT/FR2021/051981, filed Nov. 9, 2021, now published as WO 2022/101576 A1, which claims priority to French Patent Application No. 2011608, filed on Nov. 12, 2020.

TECHNICAL FIELD

This invention relates to the field of Auxiliary Power Units (APU) comprising a gas generator and installed in aircraft and more specifically relates to a method for supplying air to an auxiliary power unit from a pressurized cabin of the aircraft and the associated architecture.

PRIOR ART

The reinjection of cabin air into the high-pressure (HP) compressor of the APU is known, particularly via the application WO2014118455A1, the objective of which is to facilitate the ignition at altitude of this APU, the cabin air being mixed with the outside air (atmospheric air) in a channel upstream of this HP compressor. Different operating modes according to the flight phases of the aircraft are envisioned including: a start-up mode, in which the HP compressor is supplied solely with cabin air; a stabilized mode, in which the APU is supplied mainly with outside air; and a transient mode in which the outside air is gradually injected into the channel. This solution improves the operability of the APU by facilitating its ignition. However, the supply of air from the cabin becomes a problem, particularly in the event of a failure of the ventilation system of the cabin, and performance at high altitude is in no way improved, since the power generation capacity (operability) is reduced at high altitude.

Furthermore, with such a configuration for supplying air from the aircraft cabin, the available flow able to be injected into the APU is of necessity limited by the flow supplied to ventilate the cabin. However, particularly for commercial airplanes, this flow is relatively low and by restricting the operation of the APU thus notably degrades its performance.

SUMMARY OF THE INVENTION

This invention thus has the main aim of palliating these drawbacks by making provision for a method and an architecture for supplying air making it possible to optimize the benefits of the recirculation of cabin air for the APU performance. The invention also has the aim of making a saving in specific fuel consumption, in particular at high altitude.

This aim is achieved by a method for supplying air to a high-pressure compressor of an auxiliary gas generator from a pressurized cabin of an aircraft, a load compressor being rotationally driven by a common rotation shaft providing a mechanical coupling between the high-pressure compressor and a high-pressure turbine of the auxiliary gas generator, characterized in that to a first air flow extracted from the cabin is added a second air flow coming from the load compressor.

Thus, by supplying a supplementary source of pressurized air flow to the high-pressure compressor, this invention makes it possible to increase the power that can be extracted from the auxiliary gas generator while facilitating its ignition at high altitude and thus increase the overall efficiency thereof without significantly affecting its installation.

Advantageously, a third air flow coming from another load compressor also rotationally driven by the common rotation shaft of the auxiliary gas generator is added to the first and second air flows to supply the high-pressure compressor.

Preferably, the first air flow extracted from the cabin is limited to a given maximum value and the second air flow further supplies an air conditioning system of the aircraft.

The invention also relates to an architecture for supplying air to a high-pressure compressor of an auxiliary gas generator from a pressurized cabin of an aircraft, characterized in that it comprises: a load compressor rotationally driven by a common rotation shaft providing a mechanical coupling between the high-pressure compressor and a high-pressure turbine of the auxiliary gas generator and supplied by an outside air intake; a first regulation valve assembled at the outlet of the load compressor to control all or part of the air flow delivered by the load compressor; a second regulation valve assembled at the outlet of the pressurized cabin to control the air flow drawn from inside the pressurized cabin; a mixer receiving the outputs of the first and second regulation valves to add the air drawn from inside the pressurized cabin to all or part of the air delivered by the load compressor; and a third regulation valve assembled at the outlet of the mixer to control the air flow injected into the high-pressure compressor of the auxiliary gas generator.

Preferably, this architecture for supplying air further comprises another load compressor also associated with the auxiliary gas generator and a fourth regulation valve assembled at the outlet of this other load compressor to control all or part of the air flow delivered by this other load compressor to the mixer receiving, in addition to the outputs of the first and second regulation valves, the output of this fourth regulation valve.

Advantageously, it further comprises a bleed valve associated with each of the load compressors to ensure the stability of each of the load compressors by bleeding into the atmosphere all or part of the air delivered by each of the load compressors.

Preferably, it further comprises at the outlet of the pressurized cabin a flow limiter to limit the air flow extracted from the pressurized cabin.

Advantageously, the load compressor is connected to an air conditioning system of the aircraft and provision is also made at the outlet of the load compressor for an air flow regulation valve assembled, if necessary, in series with a shutoff valve to deliver a given air flow to an air conditioning system of the aircraft.

Preferably, the third regulation valve is further configured to, if necessary, adapt the air flow injected into the high-pressure compressor to the flow available at the outlet of the mixer.

Advantageously, it further comprises, assembled at the inlet of the high-pressure compressor, a selector valve to select the flow with the highest pressure between the outside air intake and the outlet of the third regulation valve.

Preferably, it further comprises at the outlet of the pressurized cabin a bleed valve bleeding into the atmosphere.

Finally, the invention also relates to an aircraft including a pressurized cabin, an auxiliary gas generator and an architecture for supplying air as mentioned above.

BRIEF DESCRIPTION OF THE DRAWINGS

Other features and advantages of this invention will become apparent from the description given below, with reference to the appended drawings which illustrate an exemplary embodiment thereof without any limitation and wherein:

FIG. 1 schematically illustrates an architecture for supplying air to an auxiliary gas generator according to the invention, and FIG. 2 shows the ratio of the extracted mechanical power to the nominal power for different operating conditions of an auxiliary gas generator according to the invention.

DESCRIPTION OF THE EMBODIMENTS

FIG. 1 schematically illustrates in an aircraft 10 including a pressurized cabin 12 and an auxiliary gas generator 14 conventionally including a high-pressure compressor 140, a combustion chamber 142 and a high-pressure turbine 144, an architecture for supplying air to the high-pressure compressor of this auxiliary gas generator in accordance with the invention. The term "high pressure" is used in this text to specify the compressor of the auxiliary gas generator, even if the latter includes only one compressor supplying compressed air to the combustion chamber, and thus to distinguish it from the load compressor defined hereinafter and associated with the auxiliary gas generator.

More specifically, this architecture comprises: a load compressor 16 associated with the auxiliary gas generator 14 (i.e. rotationally driven by the common rotation shaft 146 providing the compressor/turbine mechanical coupling of the auxiliary gas generator) and supplied by an outside air intake 18; a first regulation valve 20 assembled at the outlet of the load compressor to control all or part of the air flow delivered by this load compressor; a second regulation valve 22 assembled at the outlet of the pressurized cabin 12 to control the air intake drawn from inside the pressurized cabin; a mixer 24 receiving the outputs of the first and second regulation valves 20, 22 to add the air drawn from inside the pressurized cabin 12 to all or part of the air delivered by the load compressor 16; and a third regulation valve 26 assembled at the outlet of the mixer 24 to control the air flow injected into the high-pressure compressor 140 of the auxiliary gas generator 14.

The third regulation valve 26 makes it possible, if necessary, to adapt the air flow injected into the high-pressure compressor 140 of the gas generator to the flow available at the outlet of the mixer 24 by adjusting the intake pressure.

The load compressor 16 is equipped at the inlet with guide vanes 160 (IGV for Inlet Guide Vanes) to regulate its operation and ensure its supply from the outside air intake 18 which also supplies air directly to the high-pressure compressor via a selector valve 28 receiving, on the one hand, this outside air on a first inlet, and on the other hand the air exiting the third regulation valve 26 on a second inlet (note that the high-pressure compressor here has no guide vanes). This valve selects the flow with the highest pressure between the outside air intake and the outlet of the third regulation valve.

An electrical generator 30 is assembled on the common rotation shaft 146, where applicable via a reduction gearbox 32, to deliver electrical power to various electrical systems of the aircraft and in particular to an air conditioning system 34 (ECS for Environmental Control System) of the aircraft providing the ventilation of the pressurized cabin 12.

Downstream of the load compressor a set of valves is assembled for fulfilling different functions of the architecture. First of all, a bleed valve 36 (SCV or Surge Control Valve) intended to ensure the stability of the load compressor 16 by bleeding into the atmosphere all or part of the air delivered by this load compressor. Next, since the load compressor is connected to the air conditioning system, provision can be made, when it is necessary to the air conditioning system, for an ABRV (Aircraft Bleed Regulation Valve) 40 which can be assembled in series with a shutoff valve 38 (LCV for Load Control Valve) to deliver a given air flow to the air conditioning system 34. These valves as well as the first regulation valve 20 (RCV for Recirculation Control Valve) are assembled on one and the same duct 42 coming from the load compressor 16.

Upstream of the second regulation valve 22, and therefore at an outlet of the pressurized cabin 12, provision can be made for a flow limiter 44 to limit the air flow extracted from this pressurized cabin, the air content of which can moreover be bled into the atmosphere if necessary by a bleed valve 46 placed at another outlet of the pressurized cabin.

This set of valves is of course controlled from a control module 48 which acts on their opening as a function of the different flight phases of the aircraft, as will be explained in more detail further on.

In applications in which the air flow coming from the load compressor 16 proves insufficient to supply the high-pressure compressor 140 (for example in the case of business jets) an additional air flow of a supplementary air supply source 50 can be added, including another load compressor 52 also associated with the auxiliary gas generator 14 via the common rotation shaft 146, and a set of valves which is controlled in an identical manner to that of the first load compressor 16 via the control module 48.

More specifically, a supplementary regulation valve 54 is assembled at the outlet of this load compressor to control all or part of the air flow delivered to the mixer 24 which, besides the outputs of the first and second regulation valves 20, 22, will receive the output of this supplementary regulation valve.

Like the first load compressor 16, this supplementary load compressor 52 is provided at the inlet with guide vanes 520 to regulate its operation and ensure its supply from an outside air intake 58 which can be the same as that of the first. Similarly, provision is made for a bleed valve 56 to ensure the stability of this supplementary load compressor 52 by bleeding into the atmosphere all or part of the air it delivers.

The operation of this architecture for supplying air is as follows. In the majority of current applications of auxiliary power generating units (APU), this only supplies, in flight, mechanical power (and electrical power via the generator 30), and the air for the air conditioning system (ECS 34) is drawn off the main engines of the aircraft (the valves 38 and 40 are then closed).

With this invention, the APU includes a load compressor 16 associated with the gas generator and the hot air coming from this load compressor is deviated toward the mixer 24 which mixes it with the cooler air coming from the pressurized cabin 12. By way of example, the temperature of the hot air could be in the vicinity of 450 K, while the temperature of the cooler air would remain below 400 K. However, if the shutoff 38 and regulation 40 valves permit it, the load compressor can also supply pneumatic energy to the air conditioning system 34, in order to distribute the available flow between this system 34 and the high-pressure compressor 140 when necessary.

The benefit of this solution is that it supplies the high-pressure compressor with pressurized air and with a sufficient flow to avoid over-restricting the operation of the auxiliary gas generator. In addition, in nominal operation, the auxiliary gas generator then operates over a reduced operating range (the cabin temperature and pressure being regulated over all the flight phases) for which it can be optimized. This solution does not require the addition of any major components to current architectures and uses a component which is at present unused in flight (the load compressor), which facilitates its installation. The load compressor will always supply a maximum flow, within the limit of its stability region and a pressure ratio compatible with the cabin pressure, a greater recirculated flow making it possible to optimize in-flight performance.

On the ground and at low altitude, the regulation valves 20, 22 and 26 are closed, the high-pressure compressor 140 is supplied with outside air from the intake 18 via the selector valve 28 and the auxiliary gas generator 14 operates in a "conventional" mode, being then able to supply an electrical power and a nominal pneumatic power via its load compressor.

In flight and in nominal operation, the regulation valves 20 and 26 are open along with the regulation valve 22 connecting the pressurized cabin to the auxiliary gas generator 14, the high-pressure compressor 140 is supplied with a mixture of cabin air and air coming from the load compressor according to the selection made of the highest pressure by the selector valve 28, and the flows are controlled by the opening of the valves in order to maintain the cabin pressure at an acceptable level. It should be noted that in flight, the air conditioning system 34 is generally not supplied with pressurized air by the load compressor, since this pressurized air is drawn off the engine or engines of the aircraft. Hence, the shutoff valve 38 and the air flow regulation valve 40 will remain generally closed in flight, which makes it possible to supply the mixer 24 with the entirety of the air flow supplied by the load compressor 16, via the regulation valve 20. The guide vane 160 is also controlled so that the load compressor 16 can supply the required flow at a pressure compatible with the flow coming from the cabin, optimal performance being obtainable when the load compressor supplies a maximum flow to the high-pressure compressor, its flow capacity being a function of altitude.

In the event of loss of cabin pressurization, the regulation valve 22 is commanded to close itself or closes automatically and the cabin is isolated from the circuit of air recirculation from the load compressor. The auxiliary gas generator 14 is then supplied from the outside air intake 18, and can generate electrical and/or pneumatic power in a nominal manner.

In the event of extinction of the auxiliary gas generator, the regulation valve closes and the cabin air is reinjected into the compressor in order to facilitate the reignition of the auxiliary gas generator 14 whatever the altitude.

FIG. 2 shows an example of the ratio of the mechanical power extracted from the auxiliary gas generator to its nominal power in the stabilized rating, for different altitudes and according to four distinct architectures: a "conventional" architecture in which the high-pressure compressor is supplied solely with outside air (curve 60), an architecture in which the high-pressure compressor is supplied solely and without limitation of flow by air coming from the cabin (curve 62), an architecture in which the high-pressure compressor is supplied solely by cabin air, the flow of which is saturated between 0.4 and 1.0 kg/s (curves 64, 66, 68, 70) and an architecture in accordance with the invention in which the high-pressure compressor is supplied by cabin air, the flow of which is saturated between 0.4 and 1.0 kg/s (curves 72, 74, 76, 78) and mixed with air coming from the load compressor (the intermediate curves correspond to flows of 0.6 and 0.8 kg/s).

Note that the contribution of the load compressor makes it possible to increase the mechanical power that can be extracted from the auxiliary gas generator, since the power drawn by the load compressor off the rotation shaft is offset by the flow that it contributes (reducing the restriction on the operation of the auxiliary gas generator). For the different levels of cabin air flow adopted, a contribution of available power corresponding to a reduction in the specific fuel consumption of the auxiliary gas generator can also be noted.

A comparison of the extracted power gives the transitional altitude of a "conventional" mode (supply by outside air—curve 60) to the supply mode of the invention (supply by cabin air mixed with recirculated air from the load compressor—curves 72-78). In the illustrated case, the transition is effected between approximately 3 km (10000 ft—case of a cabin air flow of 1.0 kg/s) and 10 km (35000 ft—case of a cabin air flow of 0.4 kg/s). In the case of a nominal operation with an available cabin air flow of 1.0 kg/s (equivalent to an application to medium-haul aircraft), one thus obtains an available mechanical power that is virtually constant for altitudes between 0 and approximately 15 km (51000 ft), thus eliminating the pressure-altitude effect on the supply of power by the gas turbine.

It should be noted that the addition of one or more heat exchangers can be envisioned to increase the power generated by the load compressor and reduce its consumption. In particular, a heat exchanger (not shown) can be placed upstream of the regulation valve 20 and/or downstream of the mixer 24 between the cabin air and the air coming from the load compressor. The coupled heat source can be, for example, the engine oil circuit.

Similarly, the use of batteries (not shown) downstream of the electrical generator 30 can also be envisioned in order to dimension the auxiliary gas generator for a medium load, and therefore optimize its operation for a nominal point.

The invention claimed is:

1. An architecture for supplying air to a high-pressure compressor of an auxiliary gas generator from a pressurized cabin of an aircraft, wherein the architecture comprises: a load compressor rotationally driven by a common rotation shaft providing a mechanical coupling between the high-pressure compressor and a high-pressure turbine of the auxiliary gas generator and supplied by an outside air intake; a first regulation valve assembled at an outlet of the load compressor to control all or part of air flow delivered by the load compressor; a second regulation valve assembled at an outlet of the pressurized cabin to control air flow drawn from inside the pressurized cabin; a mixer receiving outputs of the first and second regulation valves to add the air drawn from the inside of the pressurized cabin to all or part of the air delivered by the load compressor; and a third regulation valve assembled at an outlet of the mixer to control air flow injected into the high-pressure compressor of the auxiliary gas generator, wherein the architecture further comprises, assembled at an inlet of the high-pressure compressor, a selector valve to select the air with the highest pressure between the outside air intake and an outlet of the third regulation valve.

2. The architecture for supplying the air as claimed in claim 1, wherein the architecture further comprises another load compressor also associated with the auxiliary gas generator and a fourth regulation valve assembled at an outlet of the another load compressor to control all or part of air flow delivered by the another load compressor to the mixer receiving, in addition to the outputs of the first and second regulation valves, an output of the fourth regulation valve.

3. The architecture for supplying the air as claimed in claim 1, wherein the architecture further comprises a bleed valve associated with the load compressor to ensure stability of the load compressor by bleeding into atmosphere all or part of the air delivered by the load compressor.

4. The architecture for supplying the air as claimed in claim 1, wherein the architecture further comprises at the outlet of the pressurized cabin, a flow limiter to limit the air flow extracted from the pressurized cabin.

5. The architecture for supplying the air as claimed in claim 1, wherein the load compressor is connected to an air conditioning system of the aircraft.

6. The architecture for supplying the air as claimed in claim 5, wherein the architecture further comprises at the outlet of the load compressor, an air flow regulation valve assembled in series with a shutoff valve to deliver a given.

7. The architecture for supplying the air as claimed in claim 1, wherein the architecture further comprises at the outlet of the pressurized cabin, a bleed valve bleeding into atmosphere.

8. An aircraft including the pressurized cabin, the auxiliary gas generator and the architecture for supplying the air as claimed in claim 1.

\* \* \* \* \*